Sept. 25, 1928.
R. A. PEACOCK
1,685,614
KICK BIKE
Filed June 18, 1926
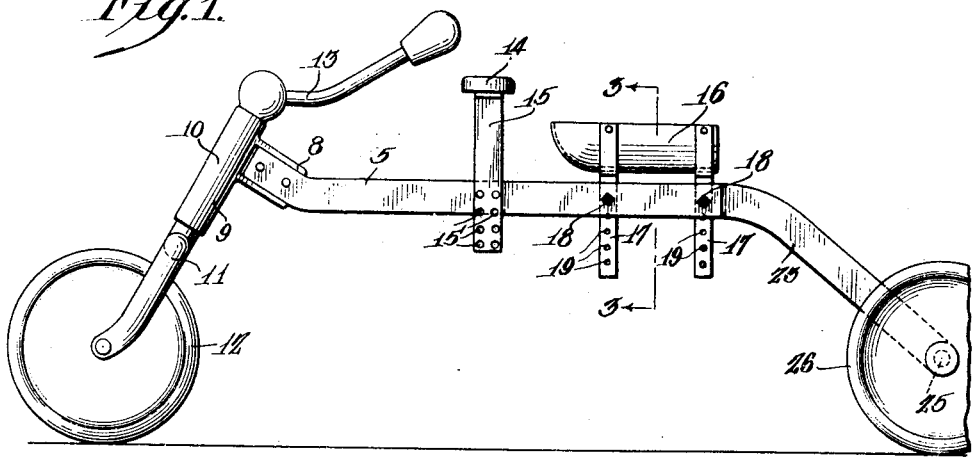
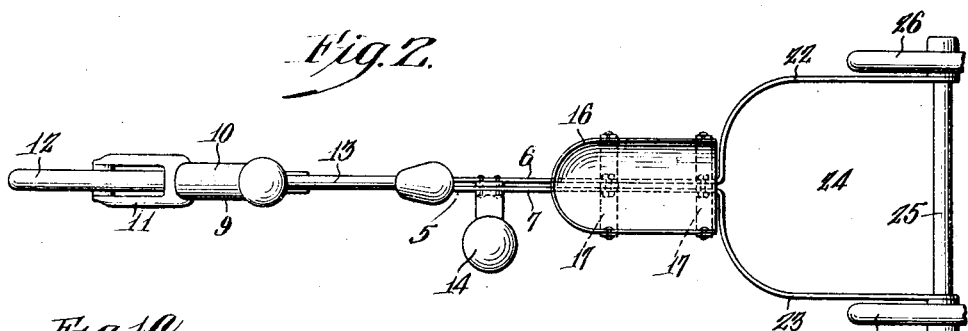
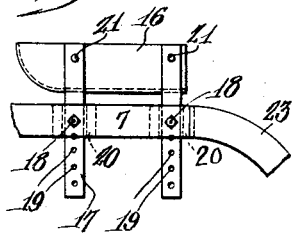
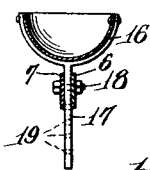
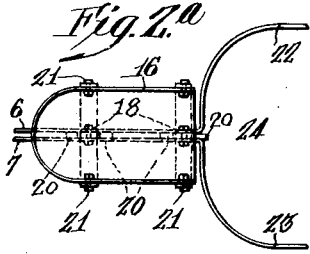
Inventor
Robert A. Peacock Patented Sept. 25, 1928.

1,685,614

UNITED STATES PATENT OFFICE.

ROBERT A. PEACOCK, OF DELAWARE CITY, DELAWARE.

KICK BIKE.

Application filed June 18, 1926. Serial No. 116,794.

My invention relates to vehicles of a type intended to be propelled by one foot of the rider.

The purpose of my invention is to provide an adjustable knee rest on a bicycle so positioned that, when in ease, one foot of the rider can be used for propelling the bicycle.

A further purpose is to provide a knee rest along with a rest for one arm or hand and so positioned that the other hand of the rider may be used upon a preferably central guiding handle.

Further purposes will appear in the specification and in the claims.

In the drawings I have illustrated the best embodiment of my invention known to me. It well illustrates the principles of my invention.

Figure 1 is a side elevation of my preferred structure.

Figure 1ᵃ is a fragmentary side elevation showing a slightly different construction from that of Figure 1.

Figure 2 is a top plan view of the structure of Figure 1.

Figure 2ᵃ is a top plan view of Figure 1ᵃ.

Figure 3 is a section taken upon line 3—3 in Figure 1 looking in the direction of the arrows.

In the drawings similar numerals indicate like parts.

For the purpose of my invention I prefer to use a long, low, rakish frame 5 conveniently made up of duplicate members 6 and 7 which may run parallel throughout the greater part of the length of the frame and which at their front ends are riveted on opposite sides of a fitting 8 forming part of the steering head 9. Within the shell 10 of this head are formed the bearings for the spindle of fork 11 carrying the front wheel 12. To this spindle is attached at the upper end a preferably single and central steering handle 13.

At an intermediate point in the length of the frame, convenient to this steering handle I mount an off-center hand or arm rest 14 mounted in any suitable way by bracket 15 and capable of being fastened so as to be off center to either side of the frame. Holes 15' provide for adjustment of the height of the rest.

To the rear of this hand or arm rest I mount a knee rest 16 which is made adjustable in height by passing its supports 17 between the side bars 6 and 7 and securing them there by bolts 18 through any of the holes 19.

In Figure 1 the supports 17 are rigid with the knee rest 16 and thus provide for vertical adjustment but without tilting. In Figures 1ᵃ and 2ᵃ blocks 20 located between the bars 6 and 7 form guides to prevent swinging of the supports 17 and these supports are pivoted to the knee rest at 21 so that the knee rest can be tilted as well as adjusted to suit the preference of the rider.

The side bars 6 and 7 are separated at the rear as at 22, 23 so as to space at 24 and to support the rear axle 25. If desired this space may be made long enough so that the rider may kick the paving within it and thus shove the bike. This also permits as much spacing of the rear wheels 26 as may be desirable. In more usual construction and use the rider would kick outside of the bike.

The skeleton construction and long narrow lines simplify the manufacture and reduce the expense of manufacture. They also give an appearance suggestive of speed.

In view of my invention and disclosure variations and modifications to meet individual whim or particular need will doubtless become evident to others skilled in the art, to obtain part or all of the benefit of my invention without copying the structure shown, and I, therefore, claim all such in so far as they fall within the reasonable spirit and scope of my invention.

Having thus described my invention, what I claim as new and desire to secure by Letters Patent is:—

1. A kick bike comprising a steering wheel and steering post, a central handle bar connected therewith extending to the rear of the steering post, a frame, rear wheels upon the frame and a knee rest toward the rear of the frame but ahead of the rear wheels.

2. A kick bike comprising a steering wheel and steering post, a central handle bar connected therewith, a frame, rear wheels upon the frame, a rest shaped in planes transversely to the bike to give lateral support to the knee and located toward the rear of the frame and an off-center rest between the knee rest and the central handle.

3. In a kick bike, front and rear wheels, a frame connecting the wheels, a steering post and central handle bar providing for steering of the front wheel, a knee rest adjustable in height toward the rear of the frame and an off-center rest between the knee rest and the handle.

4. In a kick bike, a front wheel, a steering post therefor, a central handle bar connected to steer the front wheel, a frame connected with the steering post and comprising spaced side members widely spaced at the rear, an axle at the rear of the frame, a knee rest upon the frame between the side members and an off-center rest between the knee rest and the handle bar.

5. In a kick bike, front and rear wheels, a frame connecting the wheels, a steering post and central handle bar connected therewith for steering of the front wheel, a knee rest toward the rear of the frame and an off-center hand rest between the knee rest and the handle and located higher than the knee rest.

6. A kick bike comprising a steering wheel and steering post, a central handle bar connected therewith, a frame narrow in the front part and wider at the rear, rear wheels upon the frame, a knee rest toward the rear of the frame and a hand rest located to one side of the narrow portion of the frame between the knee rest and the central handle.

7. In a kick bike, a frame, front and rear wheels connected with the frame and steering post and central handle for the front wheel and a central knee rest and off-center hand rest both vertically adjustable and both located between the wheels.

8. A kick bike comprising in a long, low rakish machine, a front wheel, steering means therefor terminating in hand-grasp guiding means well back of the front wheel, a frame, a front bearing for the steering means, a hand-rest upon the frame, a knee-rest in the rear of the hand-rest and rear wheels well back of the knee-rest, the guiding means, hand-rest and knee-rest being close together near the center of the machine.

ROBERT A. PEACOCK.